Sept. 9, 1952     E. FAUCHEUX     2,610,063
FAUCET

Filed Oct. 21, 1946     2 SHEETS—SHEET 1

Inventor
E. Faucheux
By Glascock Downing Leibold
Attys

Sept. 9, 1952 E. FAUCHEUX 2,610,063
FAUCET
Filed Oct. 21, 1946 2 SHEETS—SHEET 2

Inventor
E. Faucheux
By Bacock Downing ＆ Seebold
Attys

Patented Sept. 9, 1952

2,610,063

UNITED STATES PATENT OFFICE 2,610,063

FAUCET

Eugène Faucheux, Paris, France, assignor to Societe d'Inventions Aeronautiques et Mecaniques S. I. A. M., Geneva, Switzerland, a corporation of Switzerland Application October 21, 1946, Serial No. 704,738
In France June 23, 1944

Section 1, Public Law 690, August 8, 1946
Patent expires June 23, 1964

3 Claims. (Cl. 277—42)

My invention relates to faucets of the double-valve type, in which a pair of valve seats are formed in the casing of the faucet and a common stem is manually actuated to move, either simultaneously or successively, two valves arranged in series to cooperate with said seats, away from said seats against the action of a return spring when it is desired to open the faucet.

In faucets of this type, the upstream valve acts as a check valve to prevent floods in case of accidental break of the faucet and is usually constituted by a ball freely mounted in a cage sleeve.

The object of the present invention is to improve faucets of this type so that all vibrations creating what is called "ramming" or "knocking" effects in the water pipe when the faucet is open or closed be prevented or at least minimized.

Further objects of the invention include improvements in details of construction and arrangement of parts whereby a simple and effective faucet is provided, having long life and modern appearance.

According to the present invention, these objects are attained by providing intentionally a small leak through the upstream or check valve and by transforming the chamber between the two seats into a detent chamber.

I found experimentally that by letting thus a small amount of liquid flow out from this detent chamber after the closing of the upstream or check valve but prior to the closing of the downstream valve or, inversely, after opening of the downstream valve but prior to the opening of the upstream or check valve, all undesirable vibrations, ramming or knocking actions in the water pipes, taking place when the faucet is respectively closed or opened, are effectively avoided or suppressed.

With this and other objects in view, as will appear hereinafter, my invention consists of certain novel features of construction, combination and arrangement of parts, as will be hereinafter described in details and particularly set forth in the appended claims, reference being had to the accompanying drawings, in which:

Figure 1:
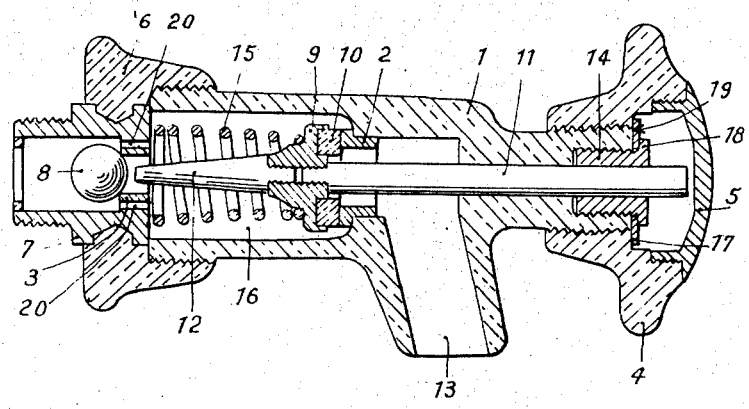
Figure 1 is a longitudinal axial section of a preferred embodiment of my improved faucet.

In Figure 1, I designates the body or casing of the faucet, in which are formed in series two valve seats 2 and 3. The casing I is preferably made of molded plastic material and is threaded at both ends to receive an actuating member 4, 5 also made of plastic material, and a plastic nut 6, molded around a cage sleeve 7, forming the upstream continuation of the casing I, in which is formed the seat 3 and is retained a ball or check valve 8. The downstream valve cooperating with the seat 2 comprises a stainless steel member 9 provided with a circular groove to receive a rubber ring 10.

The member 9 is internally threaded to receive the opposite ends of two stems or rods 11, 12, arranged in the longitudinal axis of the faucet. The stem 11 traverses the discharge spout 13 of the faucet, the neck of the casing I, a stuffing-box 14 and terminates under the center of the part 5 of the actuating member 4, 5. The stem 12 is preferably conical and stops short of the ball 8 in the seat 3. Around this conical stem 12 is mounted a return spring 15, which presses on one side on the seat 3 and on the other side on the downstream valve 9, 10 and which is lodged in the intermediate chamber 16, formed between the two seats 2 and 3.

In order to prevent any accidental unscrewing of the member 4, 5, when it is manually operated to open the faucet, a washer 17 is squeezed between the end-wall of the casing I and the circular head 18 of the stuffing-box 14. This washer 17 projects beyond the casing I so as to cooperate with an inner shoulder 19 of the part 4 of the operating member 4, 5 and to act as a stop to prevent the turning of this member in the wrong direction when it is desired to open the faucet.

In this preferred embodiment, the small leak intentionally provided around or through the check valve is obtained by providing two diametrically opposed small holes 20 constituting restricted leak passages in the seat 3, thus establishing a permanent communication between the two sides of the check valve 8 and therefore transforming the chamber 16 into a detent chamber.

The operation of this embodiment is as follows: the faucet being closed, as shown Figure 1, one turns the member 4, 5 counterclockwise to open it, thereby pushing the stem 11 and moving the downstream valve 9, 10 from its seat 2. The liquid filling the chamber 16 starts then to flow through the spout 13 before the opening of the check valve 8, as there is a time lag between the opening of the two valves, due to the normal gap between the small end of the conical rod 12 and the ball 8.

To close the faucet, the member 4, 5 is then turned clockwise, thus abandoning the valve 9, 10, carrying the two stems 11 and 12, to the action of the return spring 15, which then close successively, first the check valve 8 and then the downstream valve 9, 10; but, during the interval between these two closures, liquid continues to flow through the spout 13, due to the leak around the seat 3, provided by the small openings 20, as long as the valve 9, 10 is not completely closed. This has for effect to suppress positively all undesirable vibrations in the pipe feeding the liquid to the faucet, and therefore the ramming or knocking effects caused by said vibrations.

Figure 2:
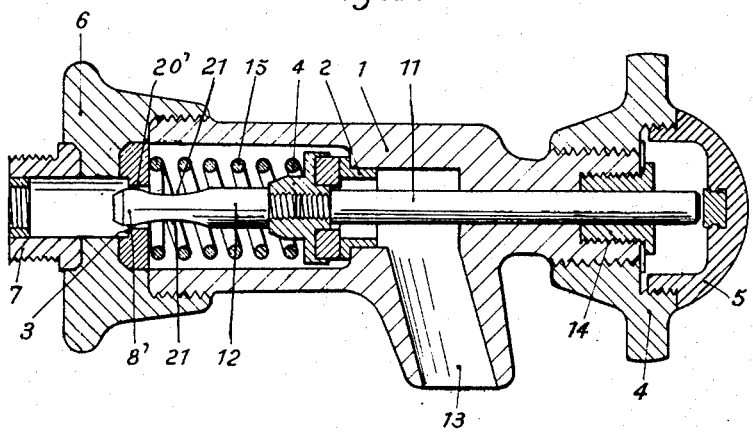
Figure 2 is a similar longitudinal section of a second embodiment thereof, specially adapted for low pressure water systems.

Figure 2 shows a second embodiment of my improved faucet, specially adapted for low pressure, in which the ball 8 is replaced by an enlargement 8', formed at the free end of the rod 12.

In this embodiment, the small leak intentionally provided through the check valve is formed by an annular narrow gap 20', formed between the inner periphery of the seat 3 and the enlarged head 8' of the rod 12' constituting a restricted leak passage. The area or section of this gap 20' is varied (preferably increased) during the opening of the faucet, by varying the cross section of the rod 12' immediately next to said head 8'. Furthermore, in this embodiment, a progressive opening—or respectively closing—of the check valve is realized by means of a pair of longitudinal concave notches 21', cut in the periphery of the cylindrical rod 12', immediately behind the restricted or rounded portion of the head 8', providing the above-mentioned increase of the permanent leak in the check valve. The other parts of this embodiment correspond to those of Figure 1 and bear similar but primed reference numerals.

Though I have shown and described a preferred construction, combination and arrangement of parts, and a certain modification thereof, I do not wish to be limited to this particular construction, combination and arrangement, nor to the modification, but desire to include in the scope of my invention the constructions, combinations and arrangements of parts substantially as set forth in the appended claims.

Having thus described my invention, what I claim as new and desire to secure by Letters Patent is:

1. A valve for liquid pipe lines subjected to pressure comprising, in combination, a casing having an outlet and inlet, an axially movable operating stem therein, a shut-off valve at the outlet end keyed to said stem, a regulating valve at the inlet end keyed to the same stem, an expansion chamber in the casing between the two valves, at least one restricted leak passage in the seat of the valve at the inlet end for preventing vibrations and water hammer when the valve is opened and closed, and the stem of the regulating valve being provided with a longitudinally restricted portion adjacent the inlet end to permit varying the delivery of liquid as a function of the movement of the stem.

2. A valve for liquid pipe lines subjected to pressure comprising in combination a casing having an outlet and an inlet, an axially movable operating stem therein, a shut-off valve at the outlet keyed to said stem, an enlarged head constituting a regulating valve on the end of said stem adjacent the inlet, an expansion chamber between the two valves, the inlet face of the expansion chamber being provided with an orifice adapted to receive the enlarged head of the stem, said orifice having a diameter slightly greater than the diameter of the enlarged head, a spring within the expansion chamber disposed between the inlet end of said chamber and the shut-off valve at the outlet end, and an actuating member adjustably threaded on the casing for effecting the axial movement of said stem.

3. A valve for liquid pipe lines subjected to pressure comprising in combination a casing having an outlet and an inlet, an axially movable operating stem therein, a shut-off valve at the outlet keyed to said stem, an enlarged head constituting a regulating valve on the end of said stem adjacent the inlet, an expansion chamber between the two valves, the inlet face of the expansion chamber being provided with an orifice adapted to receive the enlarged head of the stem, said orifice having a diameter slightly greater than the diameter of the enlarged head, at least one concave longitudinal recess provided in the stem near the regulating valve at the inlet end to permit varying the delivery of liquid as a function of the movement of the stem, a spring within the expansion chamber disposed between the inlet end of said chamber and the shut-off valve at the outlet end, and an actuating member adjustably threaded on the casing for effecting the axial movement of said stem.

EUGÈNE FAUCHEUX.

REFERENCES CITED

The following references are of record in the file of this patent:

UNITED STATES PATENTS

| Number | Name | Date |
| --- | --- | --- |
| 608,342 | McElroy | Aug. 2, 1898 |
| 826,276 | Robinson | July 17, 1906 |
| 1,592,747 | Slagle | July 13, 1926 |
| 1,801,959 | Hopkins | Apr. 21, 1931 |
| 2,481,020 | Justus | Sept. 6, 1949 |

FOREIGN PATENTS

| Number | Country | Date |
| --- | --- | --- |
| 471,757 | France | of 1914 |
| 186,040 | Switzerland | of 1936 |